(12) United States Patent
Dey et al.

(10) Patent No.: US 9,594,431 B2
(45) Date of Patent: Mar. 14, 2017

(54) QUALIFIED COMMAND

(75) Inventors: Prasenjit Dey, Karnataka (IN); Sriganesh Madhvanath, Karnataka (IN); Rama Vennelakanti, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1323 days.

(21) Appl. No.: 13/260,344

(22) PCT Filed: Jun. 19, 2009

(86) PCT No.: PCT/US2009/048045
§ 371 (c)(1),
(2), (4) Date: Sep. 25, 2011

(87) PCT Pub. No.: WO2010/147600
PCT Pub. Date: Dec. 23, 2010

(65) Prior Publication Data
US 2012/0030637 A1    Feb. 2, 2012

(51) Int. Cl.
*G06F 3/00* (2006.01)
*G06F 3/01* (2006.01)
*G06F 3/03* (2006.01)
*G06F 3/16* (2006.01)

(52) U.S. Cl.
CPC .............. *G06F 3/017* (2013.01); *G06F 3/013* (2013.01); *G06F 3/0304* (2013.01); *G06F 3/167* (2013.01)

(58) Field of Classification Search
CPC ........ G06F 3/017; G06F 3/033; G06F 3/0346; G06F 3/0425; G06F 3/0488; G06F 1/1694; G06F 2203/04808; G06F 3/011; G06F 3/013; H04N 5/4403; H04N 21/4223; H04N 5/232; G06T 2207/10016
USPC .......................... 715/234, 243, 254, 255, 863
See application file for complete search history.

(56) References Cited

U.S. PATENT DOCUMENTS

| | | | |
|---|---|---|---|
| 7,028,269 B1 * | 4/2006 | Cohen-Solal et al. | 715/863 |
| 2005/0177375 A1 | 8/2005 | Friedrich et al. | |
| 2006/0136846 A1 * | 6/2006 | Im et al. | 715/863 |
| 2007/0252818 A1 | 11/2007 | Zlotnicki | |
| 2009/0079813 A1 * | 3/2009 | Hildreth | 348/14.03 |

FOREIGN PATENT DOCUMENTS

| | | |
|---|---|---|
| JP | 06131437 | 5/1994 |
| JP | 2003520528 | 7/2003 |
| KR | 1020010075838 | 8/2001 |

OTHER PUBLICATIONS

ISA/KR, international Search Report dated Sep. 27, 2011, PCT/US2009/048045 filed Jun. 19, 2009.

* cited by examiner

*Primary Examiner* — Kyle Stork
(74) *Attorney, Agent, or Firm* — HP Inc. Patent Department (57) ABSTRACT

A method for executing a qualified command including detecting a hand gesture input for identifying a command, detecting one or more non-hand gesture inputs to qualify the command, and configuring a processor to execute the qualified command on a machine in response to the hand gesture input and one or more non-hand gesture inputs.

20 Claims, 7 Drawing Sheets

QUALIFIED COMMAND

CROSS-REFERENCE TO RELATED APPLICATION

This application is a national stage application under 35 U.S.C. §371 of PCT/US2009/048045, filed 19 Jun. 2009.

BACKGROUND

When inputting commands to be executed on a machine, a user accesses one or more input devices to input the command. When one or more input devices detect the input, one or more input devices will transfer information corresponding to the input to the machine. The machine then executes one or more commands in response to the information.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
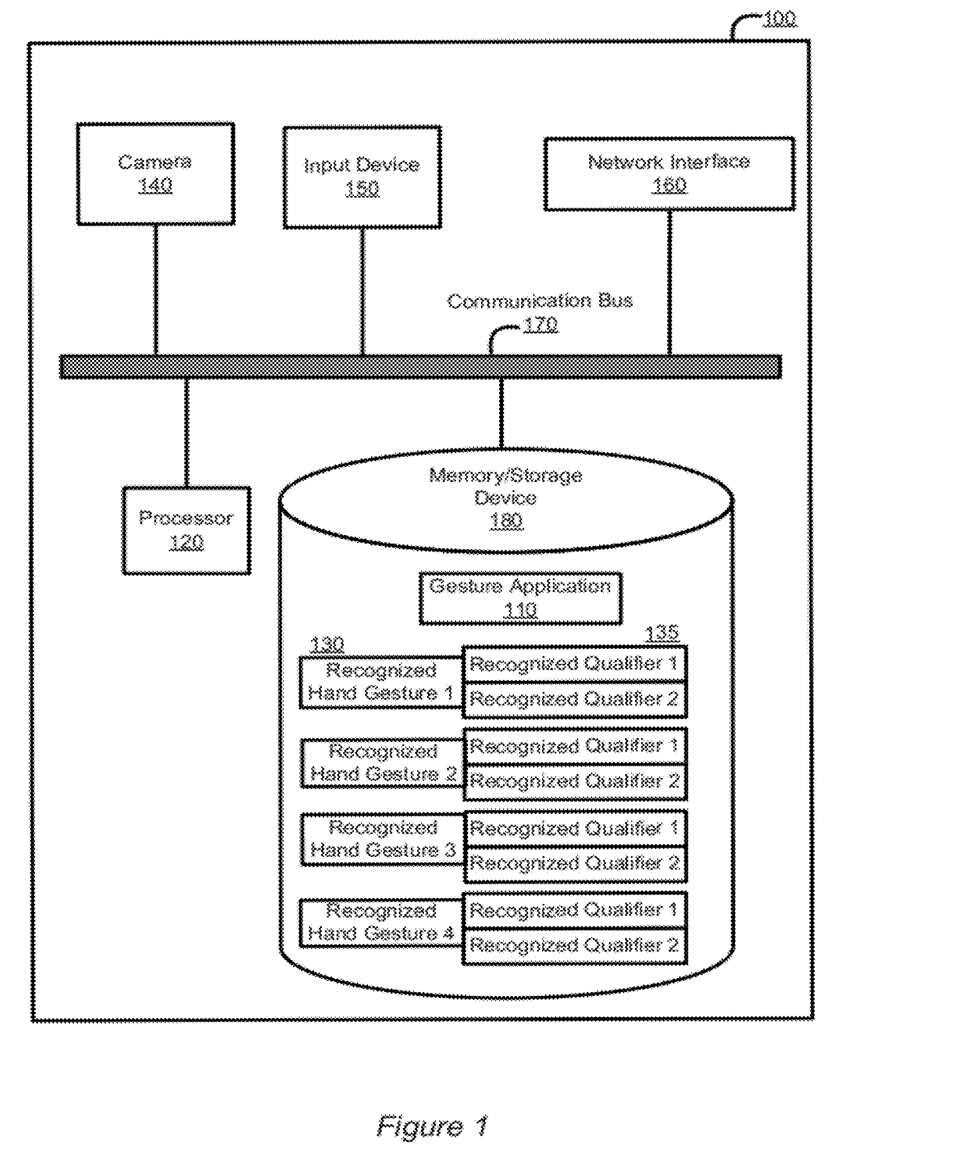
FIG. 1 illustrates a machine coupled to one or more cameras and one or more input device according to an embodiment of the invention.

FIG. 1 illustrates a machine coupled to one or more cameras 140 and one or more input device 150 according to an embodiment of the invention. In one embodiment, the machine 100 is a desktop, a laptop, a server, and/or any device that is coupled to one or more cameras 140 and/or one or more input devices 150. As illustrated in FIG. 1, the machine 100 includes a processor 120, one or more cameras 140, one or more input devices 150, a memory/storage device 180, a network interface 160, and a communication bus 170 for the machine 100 and/or one or more components of the machine 100 to communicate with one another.

Additionally as illustrated in FIG. 1, the storage device 180 stores a gesture application 110, recognized hand gestures 130, and recognized qualifiers 135. In other embodiments, the machine 100 includes additional components and/or is coupled to additional components in addition to and/or in lieu of those noted above and illustrated in FIG. 1.

As noted above, the machine 100 includes a processor 120. The processor 120 sends data and/or instructions to the components of the machine 100, such as one or more cameras 140, one or more input devices 150, and a gesture application 110. Additionally, the processor 120 receives data and/or instruction from components of the machine 100, such as one or more cameras 140, one or more input devices 150, and the gesture application 110.

The gesture application 110 sends instructions for one or more cameras 140 and/or one or more input devices 150 to capture hand gesture inputs and/or non-hand gesture inputs. Additionally, the gesture application 110 analyzes the captured hand gesture inputs and identifies a command that corresponds to a captured hand gesture input and can be executed by the machine 100. Further, the gesture application 110 will attempt to qualify the command by analyzing the captured non-hand gesture inputs and identifying one or more qualifiers that correspond to the non-hand gesture inputs (the identified command). Once the gesture application 110 has qualified the command, the gesture application 110 will instruct the processor 120 to execute the qualified command. The qualified command can be executed on one or more objects, devices, components, machines and/or environments.

The command is an instruction that can be executed by the machine 100 when the gesture application 110 identifies a command corresponding to a captured hand gesture input. In one embodiment, the command will be to zoom in/out, increase/decrease volume, proceed to next/previous, scroll up/down, open/close, rotate, browse, etc. In other embodiments, additional commands and/or instructions can be executed by the machine 100 when the gesture application 110 identifies a hand gesture in addition to and/or in lieu of those noted above.

Additionally, as noted above, the command can be qualified with one or more qualifiers. One or more qualifiers define parameters for the command. In one embodiment, one or more qualifiers specify degrees of the command, indicate which object on a display device to execute the command on, and/or specify which user is entering the command. When specifying a degree of the command, one or more qualifiers can indicate how much to perform a scrolling command, how much to increase/decrease volume, and/or how many times to zoom in/out. In another embodiment, one or more qualifiers are speech qualifiers that reinforce the command by repeating the command as part of the qualifier. In other embodiments, one or more qualifiers can compliment the command in additional ways and/or specify additional parameters in addition to and/or in lieu of those noted above. In identifying one or more qualifiers, the gesture application 110 will identify one or more non-hand gesture inputs.

Once the command has been qualified, the gesture application 110 will execute the qualified command. In one embodiment, the gesture application 110 is firmware that is embedded onto the machine 100. In other embodiments, the gesture application 110 is a software application stored on the machine 100 within ROM or on a storage device 180 accessible by the machine 100 or the gesture application 110 is stored on a computer readable medium readable and accessible by the machine 100 from a different location. Additionally, in one embodiment, the storage device 180 is included in the machine 100. In other embodiments, the storage device 180 is not included in the machine, but is accessible to the machine 100 utilizing a network interface 160 included in the machine 100. The network interface 160 may be a wired or wireless network interface card.

In a further embodiment, the gesture application 110 is stored and/or accessed through a server coupled through a local area network or a wide area network. The gesture application 110 communicates with devices and/or components coupled to the machine 100 physically or wirelessly through a communication bus 170 included in or attached to the machine 100. In one embodiment the communication bus 170 is a memory bus. In other embodiments, the communication bus 170 is a data bus.

As noted above, the machine 100 includes one or more cameras 140. One or more cameras 140 are imaging devices that are instructed by the gesture application 110 to concurrently or sequentially capture images and/or videos of users entering one or more hand gesture inputs and/or one or more non-hand gesture inputs. In one embodiment, one or more cameras 140 are embedded as part of the machine 100. In another embodiment, one or more cameras 140 are coupled to the machine 100 and are positioned at different locations in an environment where the user is located. In other embodiments, one or more cameras 140 are worn by the user as head gear or accessories.

Additionally, one or more hand gesture inputs are first modes of inputs that include one or more motions made by one or more of the user's hands. In one embodiment, the hand gesture inputs additionally include shapes made by one or more of the user's hands. Further, in making the hand gesture inputs, the user can use a single hand to make one or more motions and/or one or more shapes. In another embodiment, the user can utilize both hands to make one or more motions and/or one or more shapes.

In addition, in one embodiment, one or more cameras 140 capture the hand gesture inputs as a video stream for the gesture application 110. In another embodiment, one or more cameras 140 capture one or more hand gesture inputs as multiple still images for the gesture application 110 to analyze and identify. In other embodiments, one or more input devices 150 can also be utilized individually or in conjunction with one or more cameras 140 to detect and capture the hand gesture inputs.

One or more input devices 150 are devices that can concurrently or sequentially detect and capture hand gesture inputs and/or non-hand gesture inputs. Similar to one or more cameras 140, in one embodiment, one or more input devices 150 are embedded as part of the machine 100. In another embodiment, one or more input devices 150 are coupled to the machine 100 and are positioned at different locations in an environment where the user is located. In other embodiments, one or more input devices 150 are worn by the user as head gear or accessories.

Additionally, in one embodiment, one or more input devices 150 are a mouse or a touch screen that can detect a user's hand gesture input when the user is accessing the mouse or touch screen. In another embodiment, one or more input devices 150 are a microphone, a biometric device, one or more cameras or a motion detection device, such as an accelerometer, tilt sensor, illumination sensor, and/or proximity sensor. The cameras may be additional cameras or be included as one or more cameras 140. Further, one or more input devices 150 can be used independently or in conjunction with one or more cameras 140 to capture one or more non-hand gesture inputs.

One or more non-hand gesture inputs are inputs that are not made by one or more of the user's hands. The non-hand gesture inputs are second mode of inputs that are used to qualify the command. In one embodiment, one or more non-hand gesture inputs include audible speech. The audible speed may specify a degree of how much to perform the command and/or the audible speech can reinforce the command by including the command audible form. In another embodiment, one or more non-hand gesture inputs include a gaze. The gaze corresponds to what direction the user is looking and to what the user is looking at. In other embodiments, the non-hand gesture inputs include additional forms of input, such as the biometrics of the user.

Further, in one embodiment, the gesture application 110 can instruct one or more cameras 140 and/or one or more input devices 150 to capture one or more hand gesture inputs before capturing one or more non-hand gesture inputs. In other embodiments, the gesture application 110 instructs one or more cameras 140 and/or one or more input devices 150 to capture one or more hand gesture inputs while concurrently capturing one or more non-hand gesture inputs.

Once one or more hand gesture inputs have been captured, the gesture application 110 analyzes the hand gesture input to identify a corresponding command. As noted above, the command is an instruction that can be executed by the machine 100 when the gesture application 110 determines that a hand gesture input matches one of the recognized hand gestures 130 stored on a storage device 180. In other embodiments, the recognized hand gestures 130 and/or the recognized qualifiers 135 are stored on another device accessible to the machine 100 through a network.

The recognized hand gestures 130 are stored hand gestures that the machine 100 recognizes. In one embodiment, each recognized hand gesture 130 lists a number of hands used for the corresponding recognized hand gesture 130. In another embodiment, each recognized hand gesture 130 additionally lists one or more motions associated with the recognized hand gesture 130. In other embodiments, each recognized hand gesture 130 list a shape made by one or more hands.

In analyzing one or more hand gesture inputs, the gesture application 110 will analyze captured images and/or video streams from one or more cameras 140. In another embodiment, the gesture application 110 will additionally analyze data from one or more input devices 150. The gesture application 110 will analyze the images, video streams, and/or data to determine one or more motions made by the user when entering the hand gesture input. In one embodiment, the gesture application 110 will additionally determine from the images, video streams, and/or data how many hands were used in entering the hand gesture input. In other embodiments, the gesture application 110 will identify one or more shapes made by one or more of the user's hands.

Once the gesture application 110 has analyzed one or more hand gesture inputs, the gesture application will scan the recognized hand gestures 130 for a matching recognized hand gesture. In one embodiment, the matching recognized hand gesture will list one or more motions matching one or more motions from the hand gesture input. In another embodiment, the matching recognized hand gesture also lists a number of hands and/or one or more shapes made that match the number of hands and/or the shape of the hands made by the hand gesture input. Further, the matching recognized hand gesture will have a corresponding command that can be executed by the machine 100. As a result, after analyzing one or more hand gesture inputs, the gesture application will identify a command that corresponds to the corresponding hand gesture input.

Once the gesture application 110 has identified the corresponding command for the hand gesture input, the gesture application 110 will attempt to qualify the command using one or more of the non-hand gesture inputs. In one embodiment, if the gesture application does not detect and/or recognize one or more non-hand gesture inputs, the gesture application 110 can utilize a default qualifier to qualify the command. In other embodiments, in qualifying the command, the gesture application 110 will analyze one or more non-hand gesture inputs to identify one or more qualifiers.

The gesture application 110 will analyze images, video streams, and/or data from one or more cameras 140 and/or one or more input devices 150 to determine whether the non-hand gesture input includes, speech, gaze, and/or biometrics. The gesture application 110 will then compare the captured speech, gaze, and/or biometrics from the non-hand gesture input and scan one or more recognized qualifiers 135 corresponding to the matching recognized hand gesture.

As illustrated in FIG. 1, each of the recognized hand gestures 130 include one or more corresponding recognized qualifiers 135. One or more recognized qualifiers 135 are qualifiers that the machine 100 recognizes and can be used with the command corresponding to the matching hand recognized hand gesture. In one embodiment, each recognized qualifier lists one or more non-hand gesture inputs that correspond to the recognized qualifier. The gesture application 110 will scan the recognized qualifiers 135 for speeches, gazes, commands, and/or biometrics that match the non-hand gesture input.

If one or more of the recognized qualifiers 135 have matching speeches, gazes, commands, and/or biometrics, the gesture application 110 proceed to qualify the command with the matching recognized qualifiers 135. Once the gesture application 110 has qualified the command with one or more qualifiers, the gesture 110 application can proceed to execute the qualified command on one or more objects, devices, components, machines 100 and/or environments.

In one embodiment, the gesture application 110 can also utilize one or more cameras 140 and/or one or more input devices 150 to identify a user. The gesture application 110 can instruct one or more cameras 140 and/or one or more input devices 150 to capture hand gestures, speeches, and/or gazes when identifying the user. The gesture application 110 can utilize hand gestures, gazes, and/or voices that correspond to a user and are stored on the storage device 180. By identifying the user, the gesture application 110 can grant or deny access to the user in executing the qualified command on the object, device, machine, and/or environment.

Figure 2:
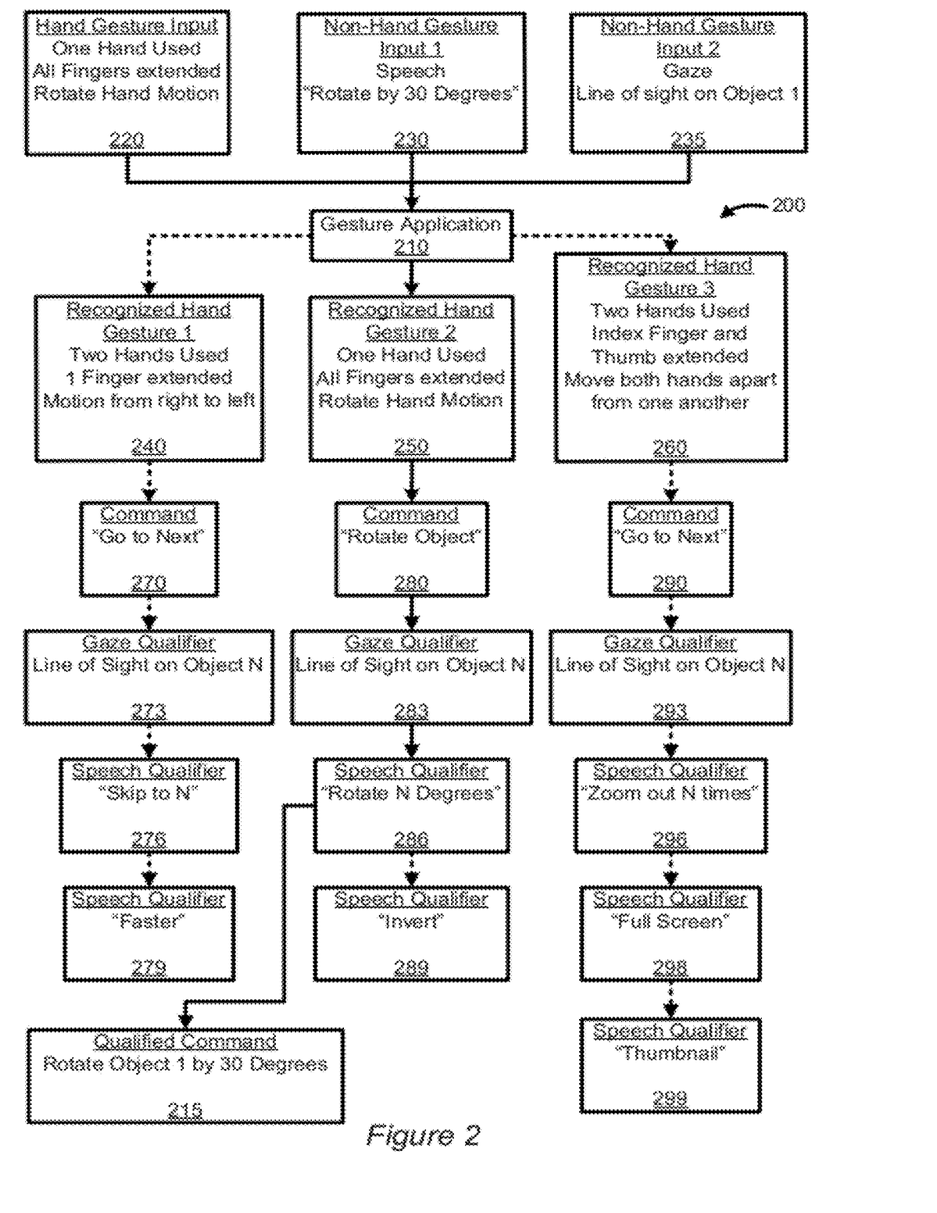
FIG. 2 illustrates a block diagram of a gesture application qualifying a command in response to one or more hand gesture inputs and one or more non-hand gesture inputs according to an embodiment of the invention.

FIG. 2 illustrates a block diagram of a gesture application 210 qualifying a command 215 in response to one or more hand gesture inputs 220 and one or more non-hand gesture inputs 230, 235 according to an embodiment of the invention. As noted above, the gesture application 210 utilizes one or more cameras and/or one or more input devices to capture one or more hand gesture inputs 220 and one or more non-hand gesture inputs 230, 235.

As illustrated in FIG. 2, in one embodiment, the gesture application 210 will analyze the hand gesture input 220 and determine that the hand gesture input 220 indicates that one hand is used, all of the fingers of the hand are extended, and that the hand is moving in a rotating manner. The gesture application 210 will then attempt to identify a corresponding command for the hand gesture input 220. As noted above, the gesture application 210 will scan recognized hand gestures 240, 250, and 260 to find a matching recognized hand gesture.

As illustrated in FIG. 2, recognized hand gesture 2 250 lists that one hand is to be used, all of the fingers of the hand are extended, and the hand will move in a rotating manner. As a result, in the present embodiment, the gesture application 210 will determine that recognized hand gesture 2 250 is a matching recognized hand gesture. Additionally, the gesture application 210 will identify that the command, "Rotate Object," corresponds to recognized hand gesture 2 250.

Once the gesture application 210 has identified the command, "Rotate Object," the gesture application 210 will proceed to attempt to qualify the command with non-hand gesture inputs 230, 235. As noted above, one or more qualifiers may include speech and/or gaze. Additionally, in one embodiment, one or more qualifiers may specify an object, machine, and/or device to execute the command on. In other embodiments, one or more qualifiers may additionally specify degrees of the command.

As illustrated in FIG. 2 and as noted above, each of the recognized hand gestures include one or more corresponding recognized qualifiers. As shown in FIG. 2, recognized hand gesture 2 250 includes 3 corresponding recognized qualifiers, 283, 286, 289. Additionally, as illustrated in FIG. 2, other recognized hand gestures may include a different number of recognized qualifiers and different corresponding commands. The gesture application 210 will analyze the non-hand gesture inputs 230, 235 to identify corresponding qualifiers that can be used with the command.

In one embodiment, as illustrated in FIG. 2, the gesture application will determine that non-hand gesture input 1 230 is a speech input. The gesture application 210 will scan recognized qualifiers 283, 286, and 289, which correspond to recognized hand gesture 2 250, to determine whether any of the recognized qualifiers include speech. The gesture application will determine that recognized qualifiers 286 and 289 include speech. Additionally, the gesture application 210 goes onto determine whether recognized qualifiers 286 or 289 include the speech "Rotate by 30 Degrees." The gesture application 210 will identify that recognized qualifier 286 includes speech to "Rotate N Degrees" and determine that recognized speech qualifier 286 can be used to qualify the command.

Additionally, the gesture application 210 will determine that the number 30 specified in the non-hand gesture input 1 230 specifies the amount or degree of rotation. Further, the gesture application 210 will also analyze non-hand gesture input 2 235 and attempt to qualify the command. The gesture application 210 will determine that non-hand gesture input 2 235 does not include a speech input, but it does include a gaze input. The gesture application 210 will read from the non-hand gesture input 2 235 that a user entering the hand gesture input 220 and the non-hand gesture inputs 230, 235 has a line of sight on object 1.

The gesture application 210 will again scan the recognized qualifiers 283, 286, and 289 to determine whether any of the recognized qualifiers include a gaze qualifier that can specify an object. As illustrated in FIG. 2, the gesture application will determine that recognized qualifier 283 includes a gaze qualifier that can specify an object to execute the command on. As a result, the gesture application will qualify the command, "Rotate Object," with the recognized qualifiers specifying to execute the command on "Object 1" and to "Rotate by 30 degrees" to obtain the qualified command "Rotate Object 1 by 30 Degrees."

Figure 3:
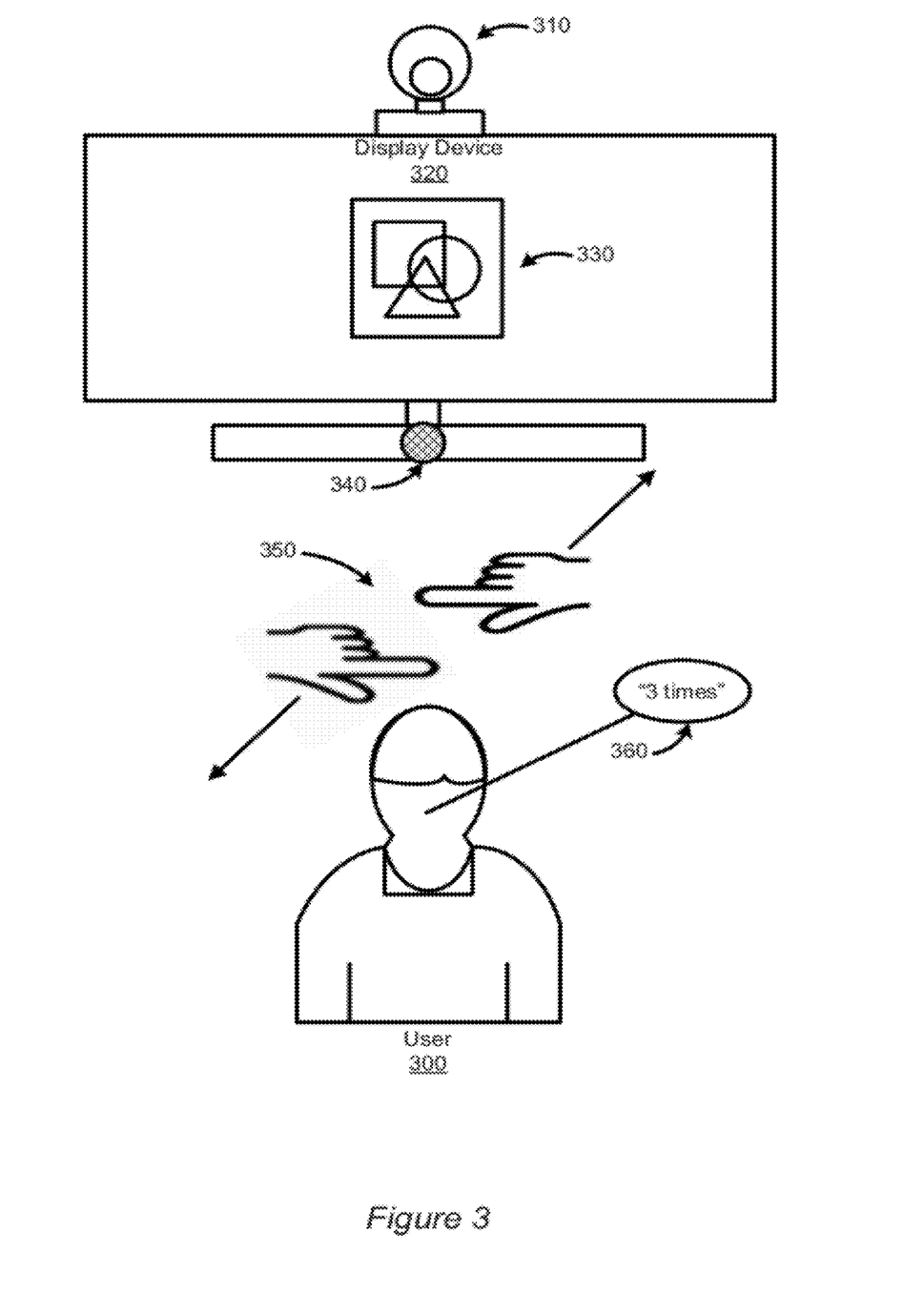
FIG. 3 illustrates a camera detecting a user's hand gesture input and a microphone detecting a user's non-hand gesture input according to an embodiment of the invention.

FIG. 3 illustrates a camera 310 detecting a user's 300 hand gesture input 350 and a microphone 340 (input device) detecting a user's non-hand gesture input 360 according to an embodiment of the invention. As noted above, a camera 310 can be instructed by a gesture application to detect and capture hand gesture inputs 350 and/or non-hand gesture inputs 360 made by the user 300.

As illustrated in FIG. 3, in one embodiment, the camera 310 captures the user 300 making a hand gesture 350 with both hands. Additionally, as illustrated in FIG. 3, in the present embodiment, the hand gesture 350 made by the user 300 involves the user moving both of his hands away from one another following a diagonal motion. As noted above, the camera 310 will capture the motion. Further, as illustrated in FIG. 3, the camera 310 can additionally capture a shape of the hand gesture 350 made by the user 300. The camera 310 will capture the user 300 having index fingers and thumbs on both hands extended, while the remaining figures are retracted or closed. In other embodiments, the shape of the hand gesture 350 made by the user 300 includes additional fingers, extensions of the fingers, retractions of the fingers, and/or configurations of the fingers.

As noted above, the gesture application will analyze the hand gesture input 350 to identify a corresponding command. Additionally, in analyzing the captured hand gesture input 350, the gesture application will compare the number of hands used, the shape of the hands, and/or motions made by the hands to recognized hand gestures. Further, as noted above, the recognized hand gestures include commands that correspond to a number of hands used, hand shapes made, and/or hand motions made.

In one embodiment, the gesture application will scan a list of recognized hand gestures or access a database of recognized commands and recognized qualifiers for a corresponding command that involves the user using both hands, with index fingers and thumbs extended (the shape of the hands), and moving away from one another in a diagonal movement (motions of the hands). In one embodiment, the gesture application will find that the number of hands, shape of the hands, and the motion of hands match a criteria of a "zoom out" command. As a result, the gesture application will choose the "zoom out" command to execute.

Further, as illustrated in FIG. 3, one or more input devices, in the present embodiment, a microphone 340, can be instructed by the gesture application to detect and capture one or more non-hand gesture inputs 360. As noted above, in one embodiment, one or more input devices (the microphone 340) can detect the non-hand gesture input 360 while the camera 310 concurrently captures the hand gesture 350. In another embodiment, the microphone 340 detects the non-hand gesture input 360 sequentially after the camera 310 has detected and captured the hand gesture 350.

Further, as noted above and illustrated in FIG. 3, the non-hand gesture input 360 may include speech. Additionally, as noted above, the non-hand gesture input 360 is used to qualify the command made from the hand gesture 350 by specifying a degree of the command. As illustrated in FIG. 3, the microphone 340 will detect and capture the non-hand gesture input 360 as "3 times," The gesture application will then search recognized qualifiers corresponding to the command "zoom out" to determine if the speech qualifier is recognized and whether the speech qualifier is compatible with the "zoom out" command. In on embodiment, the gesture application will find a recognized qualifier that includes speech to qualify the "zoom out" command by performing it "n times." As a result, the gesture application will qualify the command of "zoom out" with the qualifier "3 times" and proceed to perform the qualified command of "zoom out 3 times."

Figure 4:
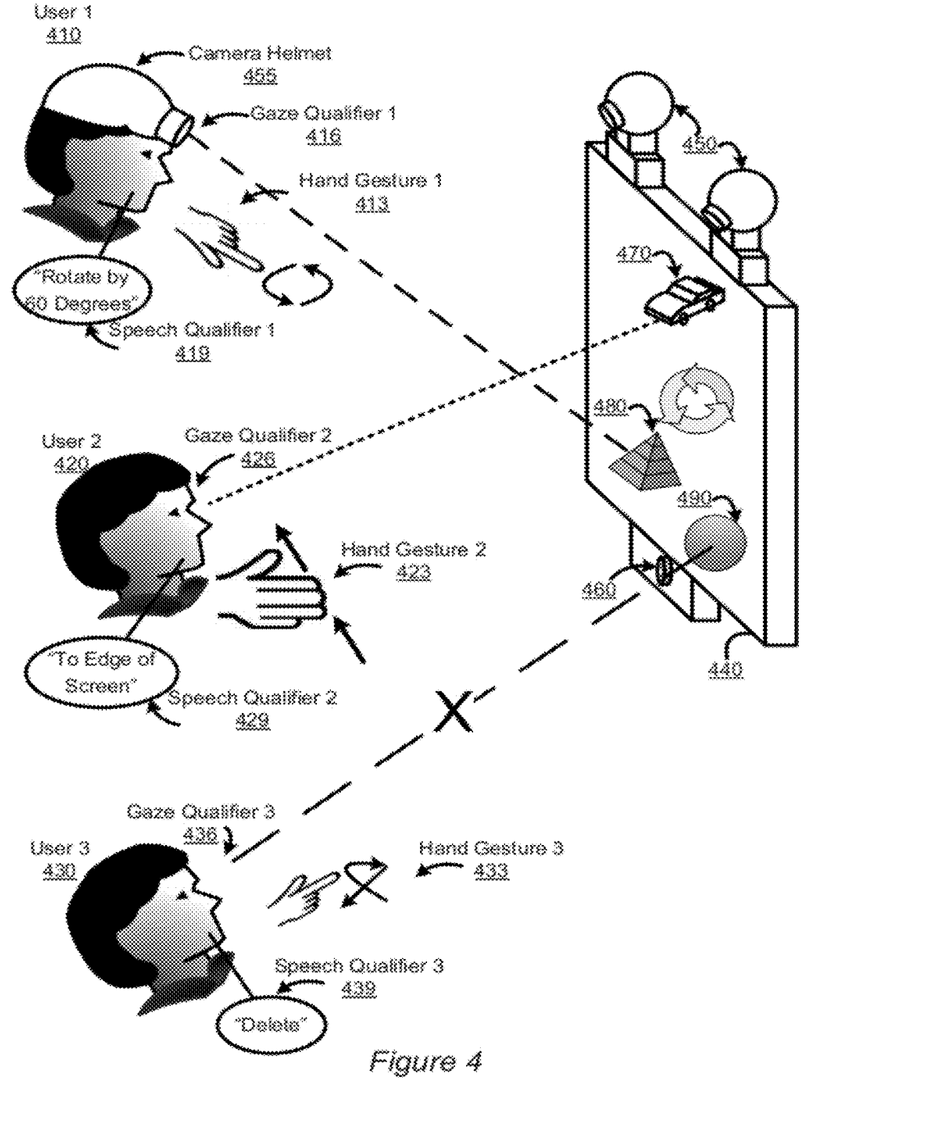
FIG. 4 illustrates users entering hand gesture inputs and non-hand gesture inputs to qualify commands that will be executed on objects shown on a display device according to an embodiment of the invention.

FIG. 4 illustrates users 410, 420, and 430 entering hand gesture inputs and non-hand gesture inputs to qualify commands that will be executed on objects shown on a display device according to an embodiment of the invention. As noted above and illustrated in FIG. 4, in one embodiment, a machine includes one or more cameras 450 and/or input devices 460 configured by a gesture application to capture one or more hand gesture inputs and/or one or more non-hand gesture inputs from users. Additionally as noted above, in one embodiment, one or more cameras 455 can be worn by a user 1 410 as an accessory.

Further, as shown in FIG. 4, in one embodiment, a display device 440 displays multiple objects 470, 480, and 490. The display device 440 is any device that can display or project objects and/or instructions. In one embodiment, the display device is a monitor or television. In other embodiments, the display device 440 is a projector. As noted above, one or more objects can be displayed on the display device 440 and can be interacted with by users entering hand gesture inputs and non-hand gesture inputs.

As illustrated in FIG. 4, in one embodiment, user 1 410 is wearing camera helmet 455 and the camera helmet 455 is capturing a non-hand gesture input, gaze qualifier 1 416. Additionally, while the camera helmet 455 is capturing gaze qualifier 1 with a line of sight on object 480, cameras 450 are capturing the hand gesture 1 input 413 by user 1 410. In another embodiment, the camera helmet 455 can also be utilized by user 1 410 to capture the hand gesture 1 input 413. Further, as illustrated in FIG. 4, user 1 410 is also concurrently entering another non-hand gesture input, speech qualifier 1 419. Speech qualifier 1 419 will be captured by input device 460, a microphone, for the gesture application. As illustrated in FIG. 4, speech qualifier 1 419 includes the "rotate" command. In one embodiment, the gesture application can utilize the command included in the speech qualifier to reinforce or reconfirm the hand gesture command. By analyzing hand gesture 1 input 413, gaze qualifier 1 416, and speech qualifier 1 419, the gesture application determines that user 1 410 wishes to enter the qualified command, "rotate object 480 60 degrees."

Additionally, while the gesture application is qualifying the command for user 410, the gesture application can also qualify a command for user 2 420. As illustrated in FIG. 4, one or both of the cameras 450 are capturing a hand gesture 2 input 423 and a gaze qualifier 2 426 from user 2 420. Additionally, the microphone 460 will also be capturing a non-hand gesture input, speech qualifier 2 429. The gesture application will determine from hand gesture 2 input 423 that a panning action from right to left can be executed. Additionally, the gesture application will qualify the command with gaze qualifier 2 426 to identify that the command will be executed on object 470 and speech qualifier 429 to pan to the edge of the screen. As a result, the gesture application will determine that user 2 420 is trying to "pan object 470 to the edge of the screen."

Further, in one embodiment, the gesture application can qualify a command for user 3 430 after executing the qualified commands for user 1 410 and user 2 420. As illustrated in FIG. 4, one or more of the cameras 450 can capture hand gesture 3 input 433 and non-hand gesture input 3, the gaze qualifier 436 from user 3 430. Further, the microphone 460 can capture another non-hand gesture input, speech qualifies 3, 439. As a result, the gesture application will determine that user 3 430 is trying to "delete object 490."

As noted above, in embodiment, if the gesture application can not identify a command that corresponds to the hand gesture, the gesture application can instruct the display device 440 to output a not recognized message and/or a message prompting the user to redo the hand gesture. In another embodiment, the gesture application will additionally instruct the display device 440 to display an example or sample hand shapes and/or motions that are recognized by the gesture application. The gesture application can also do this when the gesture application cannot identify one or more of the non-hand gesture inputs.

Figure 5:
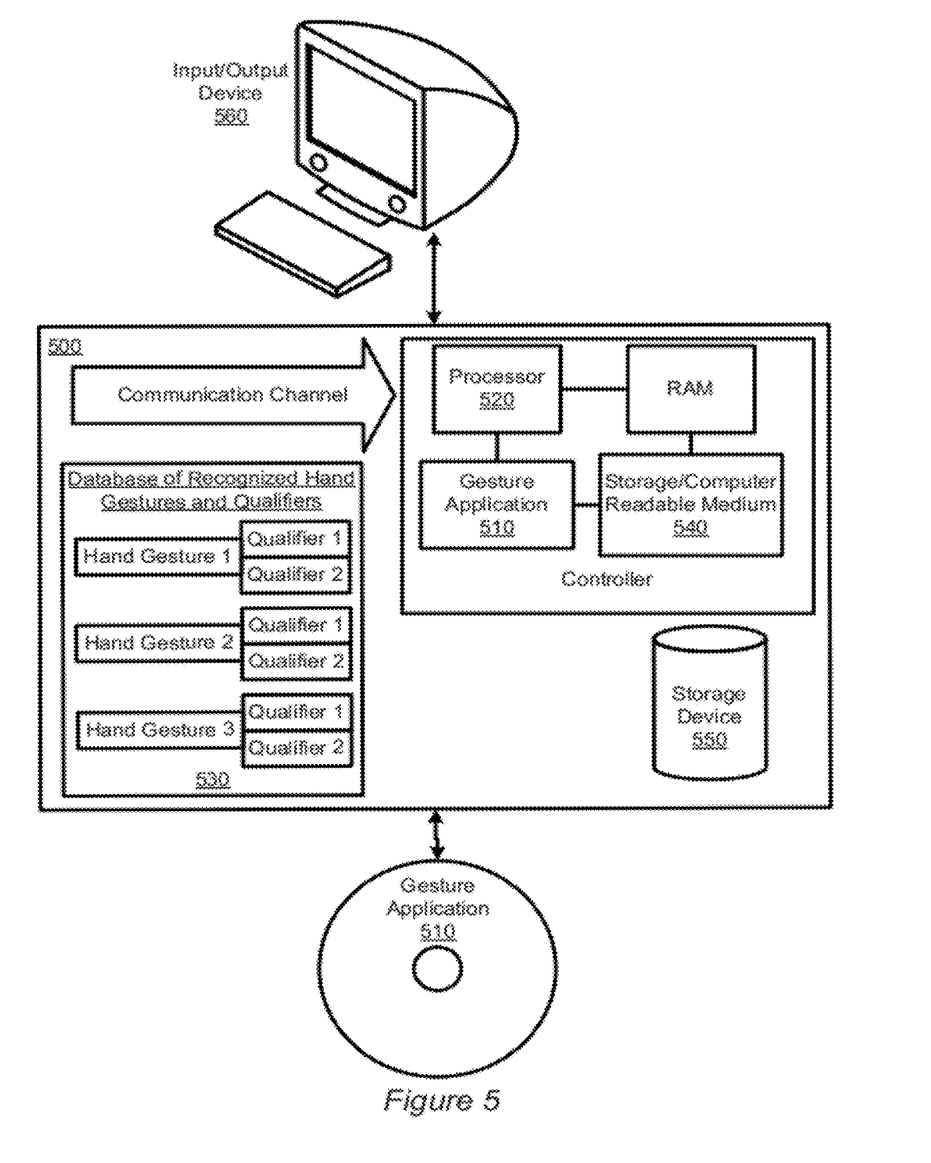
FIG. 5 illustrates a machine with an embedded gesture application and a gesture application stored on a removable medium being accessed by the machine according to an embodiment of the invention.

FIG. 5 illustrates a machine with an embedded gesture application and a gesture application 510 stored on a removable medium being accessed by the machine 500 according to an embodiment of the invention. For the purposes of this description, a removable medium is any tangible apparatus that contains, stores, communicates, or transports the application for use by or in connection with the machine 500. As noted above, in one embodiment, the gesture application 510 is firmware that is embedded into one or more components of the machine 500 as ROM. In other embodiments, the gesture application 510 is a software application which is stored and accessed from a hard drive, a compact disc, a flash disk, a network drive or any other form of computer readable medium that is coupled to the machine 500.

Figure 6:
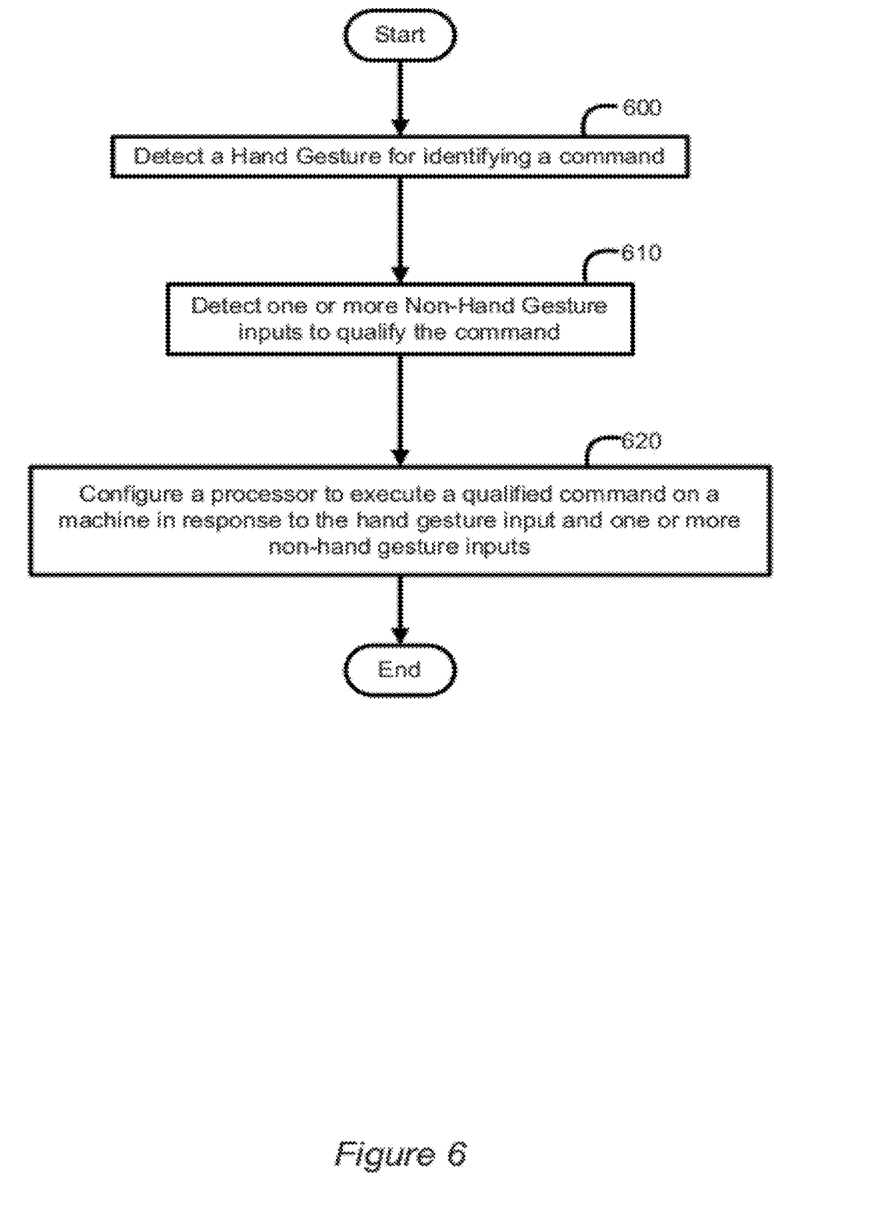
FIG. 6 is a flow chart illustrating a method for executing a qualified command according to an embodiment of the invention.

FIG. 6 is a flow chart illustrating a method for executing a qualified command according to an embodiment of the invention. The method of FIG. 6 uses one or more cameras and/or one or more input devices to detect one or more hand inputs and one or more non-hand gesture inputs. Additionally, the method of FIG. 6 utilizes a gesture application that will recognize the corresponding hand gesture input and qualify a command corresponding to the hand gesture input with one or more qualifiers. In other embodiments, the method of FIG. 6 uses additional components and/or devices in addition to and/or in lieu of those noted above and illustrated in FIGS. 1, 2, 3, 4, and 5.

As noted above, the gesture application will initially instruct one or more cameras and/or one or more input devices to detect a hand gesture input for identifying a command 600. As noted above, in detecting the hand gesture input, one or more cameras and/or one or more input devices will capture a user making a hand gesture input. Once the hand gesture input has been captured, the gesture application will compare the capture hand gesture input to recognized hand gestures stored on the machine. As noted above, in one embodiment, the recognized hand gestures are stored as a list in a file. In another embodiment, the recognized hand gestures are stored in a database accessible to the machine.

Further, as noted above, if the gesture application does not recognize the hand gesture captured, the gesture application can instruct a display device coupled to the machine to output a message indicating that the hand gesture input was not recognized and/or for the user to re-input one or more hand gesture inputs. Once the gesture application has identified a command corresponding to the hand gesture input, the gesture application will proceed to detect one or more non-hand gesture inputs to qualify the command 610.

In another embodiment, one or more non-hand gesture inputs may have been captured by one or more input devices before the hand gesture input was is captured and identified. In other embodiments, one or more hand gesture inputs and one or more non-hand gesture inputs can be captured concurrently with one or more cameras and/or one or more input devices. As noted above, in one embodiment, one or more non-hand gesture inputs include speech and/or gaze.

Once one or more non-hand gesture input has been captured, the gesture application will then proceed to qualify the command with one or more of the recognized qualifiers. As noted above, the recognized qualifiers correspond to the identified command and specify parameters for the command. Similar to above, in one embodiment, the recognized qualifiers are stored as a list in a file. In another embodiment, the recognized qualifiers are stored in a database accessible to the machine. The gesture application will scan the recognized qualifiers for one that matches one or more non-hand gesture inputs that have been captured.

Additionally, if the gesture application does not recognize the non-hand gesture input, the gesture application can instruct the display device coupled to the machine to output a message indicating that the non-hand gesture input was not recognized and/or for the user to re-input one or more non-hand gesture inputs. In another embodiment, the gesture application can instruct the display device to display a list of recognized qualifiers corresponding to the command.

Once the gesture application has qualified the command, the gesture application will configure a processor to execute a qualified command on a machine in response to the hand gesture input and one or more non-hand gesture inputs 630. The process is then complete or the gesture application continues to instruct one or more cameras and/or one or more input devices to detect one or more hand gesture inputs and one or more non-hand gesture inputs to act as qualifiers by repeating the method disclosed in FIG. 6. In other embodiments, the method of FIG. 6 includes additional steps in addition to and/or in lieu of those depicted in FIG. 6.

Figure 7:
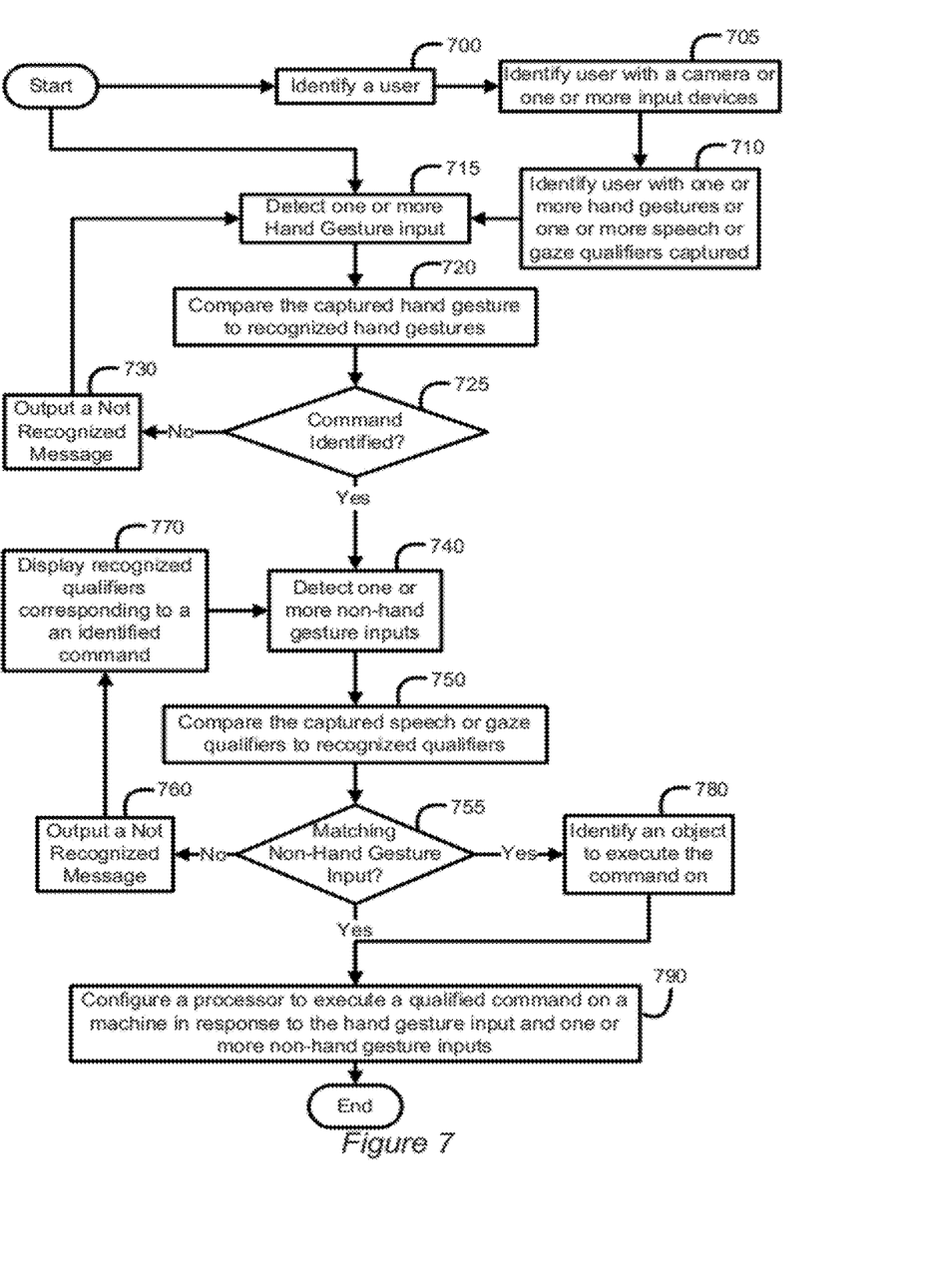
FIG. 7 is a flow chart illustrating a method for executing a qualified command according to another embodiment of the invention.

FIG. 7 is a flow chart illustrating a method for executing a qualified command according to another embodiment of the invention. Similar to the method of FIG. 6, the method of FIG. 7 uses one or more cameras and/or one or more input devices to detect one or more hand gesture inputs and one or more non-hand gesture inputs. Additionally, the method of FIG. 7 utilizes a gesture application that will recognize the corresponding hand gesture input and qualify a command corresponding to the hand gesture input with one or more recognized qualifiers. In other embodiments, the method of FIG. 7 uses additional components and/or devices in addition to and/or in lieu of those noted above and illustrated in FIGS. 1, 2, 3, 4, and 5.

As noted above, in one embodiment, the gesture application initially identifies a user which is entering commands to be executed 700. As noted above, the gesture application identifies a user with one or more cameras and/or one or more input devices 705. In one embodiment, the gesture application instructs a camera and/or one or more input devices to capture hand gestures, speech, and/or gaze to identify the user 710. By identifying the user, the gesture application can determine whether to grant the user access to the machine and whether to execute qualified commands entered by the user. The gesture application can utilize recognized hand gestures, gazes, and/or voices that correspond to a user to identify the user. In another embodiment, the gesture application can additionally instruct one or more cameras and/or one or more input devices to begin to detect hand gestures inputs and non hand gesture inputs from the user 715 while identifying the user.

In other embodiments, the gesture application can skip identifying the user and immediately instruct one or more cameras and/or one or more input devices to begin to detect hand gesture inputs from a user 715. As noted above, in detecting the hand gesture inputs, the gesture application uses one or more cameras and/or one or more input devices to capture a number of shapes used, a shape of one or more of the hands, and/or a motion of one or more of the hands.

After the gesture application has captured one or more hand gesture inputs by the user, the gesture application compares the captured hand gesture input to recognized hand gestures 720. As noted above, the recognized hand gestures can be stored as a file on the machine or as a database accessible to the machine. The gesture application will then attempt to identify a command corresponding to the hand gesture input 725 by comparing a number of hands used, shapes of the hands, and/or motions made by the hands from the hand gesture input to recognized hand gestures.

In one embodiment, if the gesture application determines that the hand gesture was not recognized, the gesture application will instruct a display device coupled to the machine to output a not recognized message 730 and/or a message prompting the user to redo the hand gesture. In another embodiment, the gesture application will additionally instruct the display device to display an example or sample hand shapes and/or motions that are recognized by the gesture application.

In other embodiments, if the gesture application finds a matching recognized hand gestures, the gesture application can select a command corresponding to the matching recognized hand gesture and proceed to attempt to qualify the command with one or more non-hand gesture inputs. As noted above, in one embodiment, one or more qualifiers are speech inputs and/or gaze inputs. Additionally, the qualifiers specify parameters of the command. In one embodiment, the qualifiers can specify degrees for the command, such as how many times to zoom in/out or how much to increase/decrease a volume. In another embodiment, the qualifiers specify which object on the display device to execute the command on. In other embodiments, one or more qualifiers can reinforce the command. In qualifying the command, the gesture application prompts one or more cameras and/or one or more input devices to detect one or more non-hand gesture inputs 740.

Once the gesture application has captured one or more non-hand gesture inputs, the gesture application can compare the captured non-hand gesture qualifiers to recognized qualifiers corresponding to the identified command 750. The gesture application can then determine whether any of the recognized qualifiers match the non-hand gesture inputs 755. Similar to above, if the gesture application can not cannot find a match, the gesture application can output a not recognized message 760 and/or a message for the user to re-input a non-hand gesture input. Additionally, in another embodiment, the gesture application can instruct the display device to output the recognized qualifiers that correspond to the identified command 770. The gesture application may then instruct one or more cameras and/or one or more input devices to detect one or more non-hand gesture qualifiers 740 in order to find one or more matching qualifiers.

Once the gesture application has found matching recognized qualifiers for the non-hand gesture inputs, the gesture application can proceed to configure a processor to execute a qualified command on the machine in response to the hand gesture input and one or more non-hand gesture inputs 790. Additionally, if one or more non-hand gesture inputs include a gaze input, the gesture application can also determine whether one or more of the non-hand gesture qualifiers specify an object to execute the command on 780.

Once the gesture application has identified the object to execute the command on, the gesture application can proceed to configure a processor to execute a qualified command on the machine in response to the hand gesture input and one or more non-hand gesture inputs 790. The process is then complete or the gesture application continues to instruct one or more cameras and/or one or more input devices to detect one or more hand gesture inputs and one or more non-hand gesture inputs to act as qualifiers by repeating the method disclosed in FIG. 7. In one embodiment, the method of FIG. 7 includes additional steps in addition to and/or in lieu of those depicted in FIG. 7.

By identifying commands associated with hand gesture inputs and identifying qualifiers corresponding to the command with non-hand gesture inputs, a user can have accurate and precise control over qualified commands that a machine executes. Additionally, by identifying a user with one or more hand gesture inputs and/or one or more non-hand gesture inputs, security, user friendliness, and convenience are gained by the user.

What is claimed is:

1. A method comprising:
   detecting a hand gesture input, wherein the hand gesture input corresponds to one of a plurality of recognized hand gestures;
   identifying, based on the hand gesture input, a command of a plurality of commands, wherein each of the plurality of recognized hand gestures uniquely identifies one of the plurality of commands;
   detecting one or more non-hand gesture inputs;
   in response to identifying the command, determining, based on the one or more non-hand gesture inputs, at least one qualifier for the command;
   qualifying, using the at least one qualifier, the command to obtain a qualified command; and
   configuring a processor to execute the qualified command on a machine in response to the hand gesture input and the one or more non-hand gesture inputs.

2. The method of claim 1 wherein a camera concurrently captures the hand gesture input and the one or more non-hand gesture inputs.

3. The method of claim 1 further comprising comparing the hand gesture input to the plurality of recognized hand gestures.

4. The method of claim 1 wherein a camera detects and captures the hand gesture input while one or more input devices concurrently detects and captures the one or more non-hand gesture inputs.

5. The method of claim 1 wherein one or more non-hand gesture inputs are used to specify a degree for the command.

6. The method of claim 1 wherein one or more non-hand gesture inputs are used to identify an object to execute the command on.

7. The method of claim 1, wherein the one or more non-hand gesture inputs include a speech input and a gaze input, wherein the speech input specifies a first qualifier of the command, and wherein the gaze qualifier specifies a second qualifier of the command.

8. The method of claim 1, wherein determining the at least one qualifier comprises:
   determining a set of recognized qualifiers associated with the command; and
   identifying, from the set of recognized qualifiers associated with the command, the at least one qualifier matching the one or more non-hand gesture inputs.

9. A machine comprising:
   a processor;
   one or more cameras configured to capture a hand gesture input;
   one or more input devices configured to capture one or more non-hand gesture inputs; and
   a gesture application executed by the processor and configured to:
      identify, from a plurality of commands, a command corresponding to the hand gesture input, wherein the hand gesture input corresponds to one of a plurality of recognized hand gestures, wherein each of the plurality of recognized hand gestures uniquely identifies one of the plurality of commands;

in response to identifying the command, determine, based on the one or more non-hand gesture inputs, at least one qualifier for the command; and qualify, using the at least one qualifier, the command to obtain a qualified command.

10. The machine of claim 9 further comprising a display device configured to display a list of recognized qualifiers corresponding to the command.

11. The machine of claim 10 wherein the display device is additionally configured to output a visual message on the display device when the hand gesture or one or more non-hand gestures are not recognized by the gesture application.

12. The machine of claim 9 wherein one or more input devices may include at least one from the group consisting of a proximity sensor, a biometric device, one or more cameras, a microphone, a touch screen, and a mouse.

13. The machine of claim 9 further comprising a database including the plurality of recognized hand gestures and recognized qualifiers corresponding to the plurality of recognized hand gestures.

14. The machine of claim 9, wherein the one or more non-hand gesture inputs include a speech input and a gaze input, wherein the speech input specifies a first qualifier of the command, and wherein the gaze input specifies a second qualifier of the command.

15. The machine of claim 9, wherein the gesture application is further to:

determine a set of recognized qualifiers associated with the command; and identify, from the set of recognized qualifiers associated with the command, the at least one qualifier matching the one or more non-hand gesture inputs.

16. A non-transitory computer-readable medium comprising:

a gesture application executable by a processor to:
identify, from a plurality of recognized commands, a command corresponding to a hand gesture of a plurality of recognized hand gestures, wherein each of the plurality of recognized hand gestures uniquely identifies one of the plurality of recognized commands;

in response to identifying the command, determine, based on one or more speech or gaze inputs, at least one qualifier for the command;

qualify, using the at least one qualifier, the command to obtain a qualified command; and execute the qualified command.

17. The non-transitory computer-readable medium of claim 16 wherein the at least one qualifier is to identify one or more objects on a display device to execute the qualified command on.

18. The non-transitory computer-readable medium of claim 16 wherein the at least one qualifier is to specify a degree of the qualified command.

19. The non-transitory computer-readable medium of claim 16 wherein the gesture application is to identify the command and determine the at least one qualifier using a database including the plurality of recognized hand gestures and qualifiers corresponding to the plurality of recognized hand gestures.

20. The non-transitory computer-readable medium of claim 16, wherein the one or more speech or gaze inputs include a speech input and a gaze input, wherein the speech input specifies a degree of the command, and wherein the gaze input specifies a target object of the command.

* * * * *